United States Patent Office 3,134,778
Patented May 26, 1964

---

3,134,778
2,5,7-TRIAMINO-4-PHENYL (OR THIENYL)-
PYRIMIDO[4,5-d]PYRIMIDINES
Joseph Weinstock, Phoenixville, and Virgil D. Wiebelhaus, Springfield, Pa., assignors to Smith Kline & French Laboratories, Philadelphia, Pa., a corporation of Pennsylvania
No Drawing. Continuation of application Ser. No. 142,474, Oct. 3, 1961. This application Aug. 20, 1963, Ser. No. 303,424
4 Claims. (Cl. 260—256.4)

This invention relates to substituted pyrimido[4,5-d]pyrimidines. More specifically this invention relates to tetrasubstituted pyrimido[4,5-d]pyrimidines having useful diuretic and hypotensive activity.

The novel compounds of this invention are represented by the following structural formula:

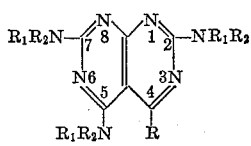

when:

$R_1$ and $R_2$ represent hydrogen, lower alkyl or phenyl lower alkyl; and

R represents aryl or substituted aryl, such as for example phenyl or chloro, methyl, methoxy, trifluoromethyl, hydroxy, or amino substituted phenyl, or a 5- to 6-membered heterocyclic group having a minimum of two and a maximum of eight carbon atoms and a minimum of one hetero atom such as oxygen, sulfur or nitrogen, the heterocyclic group being for example thienyl, furyl, pyrrolyl, pyridyl, pyrazolyl, thiazolyl, imidazolyl, isoxazolyl or thianaphthenyl.

By the term lower alkyl where used herein alone or in combination with other terms, aliphatic groups having from one to four carbon atoms are indicated.

An advantageous group of compounds of this invention is represented by Formula I when:

$R_1$ and $R_2$ represent hydrogen or methyl; and
R represents phenyl or thienyl.

A particularly active diuretic compound is 2,5,7-triamino-4-phenylpyrimido[4,5-d]pyrimidine.

Also included in this invention are the nontoxic, pharmaceutically acceptable acid addition salts of the free bases described above. These salts are readily obtained from the free bases by treatment with a wide selection of inorganic and organic acids. Exemplary of such acids are hydrochloric, hydrobromic, sulfuric, acetic, benzoic, citric, maleic, tartaric and the like. The compounds occur in some cases in a hydrated form.

Compounds of this invention are prepared by reacting a 5-cyano-6-aminopyrimidine having the following formula:

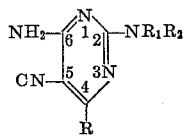

wherein R, $R_1$ and $R_2$ are as set forth in Formula I, with guanidine or an N,N-disubstituted guanidine. The reaction is advantageously carried out employing the guanidine as a salt such as for example the carbonate or sulfate, in an unreactive organic solvent such as for example ethanol or an ethylene glycol type solvent, for example ethoxyethanol and in the presence of an alkali metal alkoxide, for example sodium or potassium methoxide or ethoxide. The reaction temperature is preferably the reflux temperature of the reaction mixture in the range of from 80–140° C., and the reaction time is variable, usually for from 24 to 60 hours. Essentially equivalent amounts of the reactants are employed.

The 5-cyano-6-aminopyrimidines of Formula II are either known or are conveniently prepared by the condensation of an amidine or guanidine with malonitrile or an alkoxymethylenemalonitrile. The pyrimidine intermediates having a 2-monosubstituted amino substituent are advantageously prepared from a 2-alkylthio derivative by reaction with the appropriate monosubstituted amine, the 2-alkylthio derivatives being prepared by the condensation of thiourea with an alkoxymethylenemalonitrile or 1-amino-1-chloro-2,2-dicyanoethylene followed by alkylation of the 2-mercapto group.

Of course, alternatively the 2-alkylthiopyrimidine intermediates can be used directly in the above described condensation with a guanidine and then the resulting 2-alkylthiopyrimido[4,5-d]pyrimidine is reacted with the appropriate mono- or disubstituted amine to give the 2-mono- or disubstituted amino pyrimido[4,5-d]pyrimidine.

The compounds of this invention as represented by Formula I are advantageously used in admixture with a pharmaceutical carrier in dosage units comprising from about 10 to about 75 mg. of active compound per dosage unit. Administration of said dosage unit for from 1 to 6 times daily produces useful diuretic and hypotensive activity.

Of course, variations of the synthetic schemes described above for the preparation of the compounds of this invention are within the skill of those in the art. The following examples illustrate the perparation of compounds of this invention.

Example 1

To a solution of 12.0 g. of sodium methoxide in 600 ml. of Cellosolve is added 21.1 g. of 2,6-diamino-4-phenyl-5-cyanopyrimidine and 18.2 g. of guanidine carbonate. The resulting mixture is heated at reflux for 48 hours and then cooled. The precipitated solid is removed by filtration, washed with a large volume of water and dried in vacuo at 70° C. to give 2,5,7-triamino-4-phenylpyrimido[4,5-d]pyrimidine, M.P. >300° C. The white product is recrystallised from 5 N hydrochloric acid, then from water to give 2,5,7-triamino-4-phenylpyrimido[4,5-d]pyrimidine monohydrochloride, monohydrate, M.P. >300° C.

Example 2

Following the general procedure described in Ber. 91, 1824, 1830 (1958), 2-thiopheneglyoxylonitrile is condensed with malononitrile in the presence of an ammonium salt to give 2-thienoylmalonitrile which is then reacted with dimethylsulfate in the presence of sodium bicarbonate to give 1-(2-thienyl)-1-methoxy-2,2-dicyanoethylene. The latter compound is then condensed with guanidine to yield 2,6-diamino-4-(2-thienyl)-5-cyanopyrimidine.

Following the procedure of Example 1, a mixture of 12 g. of sodium methoxide, 21.7 g. of 2,6-diamino-4-(2-thienyl)-5-cyanopyrimidine and 18.2 g. of guanidine carbonate in 500 ml. of Cellosolve is refluxed for 48 hours. The reaction mixture is cooled and filtered to isolate the solid 2,5,7-triamino-4-(2-thienyl)-pyrimido[4,5-d]pyrimidine.

Example 3

Following the procedure of Ber. 91, 1830 (1958), 1-methoxy-1-phenyl-2,2-dicyanoethylene is condensed with N,N-dimethylguanidine to give 2-dimethylamino-4-phenyl-5-cyano-6-aminopyrimidine.

To a solution of 6.0 g. of sodium methoxide in 300 ml. of Cellosolve is added 11.4 g. of 2-dimethylamino-4-phenyl-5-cyano-6-aminopyrimidine and 9.1 g. of guanidine carbonate. The mixture is refluxed for 48 hours and worked up as described in Eample 1 to yield 2-dimethylamino-4-phenyl-5,7-diaminopyrimido[4,5-d]pyrimidine.

*Example 4*

To a solution of 18 g. of sodium methoxide in 750 ml. of Cellosolve is added 30.0 g. of 4-phenyl-2,6-diamino-5-cyanopyrimidine and 31.0 g. of N,N-dimethyl-guanidine carbonate. The resulting mixture is heated at reflux for 48 hours and worked up as in Example 1 to give 4-phenyl-2,5-diamino-7-dimethylaminopyrimido[4,5-d]pyrimidine.

*Example 5*

To a solution of 5.0 g. of sodium in 200 ml. of absolute ethanol is added 15.2 g. of thiourea and the mixture is warmed to affect solution. The solution is cooled to 40° C. and 34.6 g. of 1-methoxy-1-phenyl-2,2-dicyanoethylene is added portion-wise. The mixture is heated on the steam bath for one hour and then cooled to give the sodium salt of 2-mercapto-4-phenyl-5-cyano-6-aminopyrimidine which is dissolved in water and treated with an excess of methyl iodide to yield 2-methylthio-4-phenyl-5-cyano-6-aminopyrimidine.

Following the procedure of Example 1, equimolar amounts of sodium methoxide, 2-methylthio-4-phenyl-5-cyano-6-aminopyrimidine and guanidine carbonate are reacted to give after similar workup 2-methylthio-4-phenyl-5,7-diamino-pyrimido[4,5-d]pyrimidine. The latter is heated in an alcohol solution with an excess of 25% aqueous methylamine in an autoclave at 130° C. for three hours to yield 2-methyl-amino-4-phenyl-5,7-diaminopyrimido[4,5-d]pyrimidine.

This application is a continuation of Serial No. 142,474, filed October 3, 1961, and now abandoned.

What is claimed is:

1. A chemical compound selected from the group consisting of a free base of the following formula:

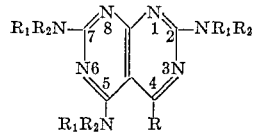

in which R is a member selected from the group consisting of phenyl and thienyl; and $R_1$ and $R_2$ are members selected from the group consisting of hydrogen and methyl, and its nontoxic pharmaceutically acceptable acid addition salts.

2. A chemical compound of the following formula:

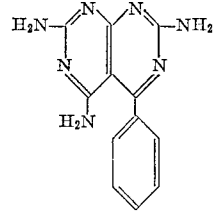

3. 2,5,7-triamino-4-phenylpyrimido[4,5-d]pyrimidine hydrochloride.

4. A chemical compound of the following formula:

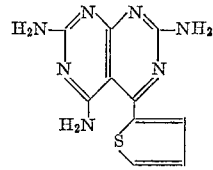

No references cited.